US012008866B2

(12) United States Patent
Hall et al.

(10) Patent No.: US 12,008,866 B2
(45) **Date of Patent: *Jun. 11, 2024**

(54) SYSTEMS AND METHODS FOR PROVIDING SECURE DATA FOR WAGERING FOR LIVE SPORTS EVENTS

(71) Applicant: SportsMEDIA Technology Corporation, Durham, NC (US)

(72) Inventors: Gerard J. Hall, Durham, NC (US); John D. Dengler, Durham, NC (US)

(73) Assignee: SPORTSMEDIA TECHNOLOGY CORPORATION, Durham, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 17/899,120

(22) Filed: Aug. 30, 2022

(65) Prior Publication Data

US 2022/0406146 A1 Dec. 22, 2022

Related U.S. Application Data

(63) Continuation of application No. 17/192,410, filed on Mar. 4, 2021, now Pat. No. 11,436,896, which is a continuation of application No. 15/903,343, filed on Feb. 23, 2018, now Pat. No. 10,943,435, which is a continuation-in-part of application No. 15/636,297, filed on Jun. 28, 2017, now Pat. No. 10,453,311, and a continuation-in-part of application No. 15/065,652, filed on Mar. 9, 2016, now Pat. No. 9,905,082.

(60) Provisional application No. 62/356,166, filed on Jun. 29, 2016, provisional application No. 62/130,438, filed on Mar. 9, 2015.

(51) Int. Cl.
*G07F 17/32* (2006.01)

(52) U.S. Cl.
CPC ...... *G07F 17/3288* (2013.01); *G07F 17/3225* (2013.01); *G07F 17/3269* (2013.01)

(58) Field of Classification Search
CPC .... G07F 17/32; G07F 17/323; G07F 17/3241; G07F 17/3288
See application file for complete search history.

(56) References Cited

U.S. PATENT DOCUMENTS

| | | | | |
|---|---|---|---|---|
| 5,507,485 | A * | 4/1996 | Fisher | A63B 71/06 473/131 |
| 7,534,169 | B2 | 5/2009 | Amaitis et al. | |
| 8,029,362 | B2 | 10/2011 | Walker et al. | |
| 8,057,300 | B2 * | 11/2011 | Corbo | G07F 17/3288 463/25 |

(Continued)

*Primary Examiner* — Chase E Leichliter
(74) *Attorney, Agent, or Firm* — NEO IP

(57) ABSTRACT

Systems and methods for betting on a live sporting event are disclosed. At least one input capture device and at least one user device are in network communication with a server platform. The at least one input capture device collects and transmits live raw data relating to the live sporting event. The server platform receives and aggregates the live raw data relating to the live sporting event from the at least one input capture device. The server platform accesses personal and/or emotional factors for each player in the live sporting event. The at least one user device places at least one bet on at least one aspect of the live sporting event to the server platform via an interactive graphic user interface (GUI) at least based on the live raw data. The server platform determines at least one betting outcome relating to the live sporting event.

20 Claims, 7 Drawing Sheets

(56) References Cited

U.S. PATENT DOCUMENTS

| | | | | |
|---|---|---|---|---|
| 8,245,157 | B2 * | 8/2012 | Kelly | G06F 3/0481 463/9 |
| 8,491,378 | B1 * | 7/2013 | Platis | G07F 17/322 463/40 |
| 8,632,392 | B2 | 1/2014 | Shore et al. | |
| 8,734,231 | B2 | 5/2014 | Shore et al. | |
| 9,138,638 | B2 | 9/2015 | Bastawros | |
| 9,251,644 | B2 * | 2/2016 | Alderucci | G07F 17/3244 |
| 9,430,909 | B2 | 8/2016 | Shore et al. | |
| 10,453,311 | B2 * | 10/2019 | Hall | G07F 17/3241 |
| 10,943,435 | B2 * | 3/2021 | Hall | G07F 17/3288 |
| 11,183,027 | B2 * | 11/2021 | Hall | G06Q 50/34 |
| 11,436,896 | B2 * | 9/2022 | Hall | G07F 17/3269 |
| 2002/0068633 | A1 | 6/2002 | Schlaifer | |
| 2002/0069161 | A1 * | 6/2002 | Eckert | G06Q 40/02 705/36 R |
| 2002/0077952 | A1 * | 6/2002 | Eckert | G06Q 40/06 705/36 R |
| 2007/0082740 | A1 | 4/2007 | Stearns et al. | |
| 2007/0233585 | A1 * | 10/2007 | Ben Simon | G07F 17/3244 705/35 |
| 2007/0259716 | A1 * | 11/2007 | Mattice | G07F 17/32 463/36 |
| 2008/0161113 | A1 * | 7/2008 | Hansen | A63F 13/335 463/42 |
| 2008/0274802 | A1 * | 11/2008 | Joao | G07F 17/3223 463/25 |
| 2009/0061978 | A1 * | 3/2009 | Ahlin | G07F 17/32 463/16 |
| 2009/0143128 | A1 * | 6/2009 | Cautley | G07F 17/329 463/17 |
| 2009/0149233 | A1 | 6/2009 | Strause et al. | |
| 2009/0253498 | A1 * | 10/2009 | Wolf | G07F 17/32 463/29 |
| 2010/0087241 | A1 * | 4/2010 | Nguyen | G06F 3/04886 463/17 |
| 2010/0203940 | A1 * | 8/2010 | Alderucci | G07F 17/3293 463/16 |
| 2010/0317420 | A1 * | 12/2010 | Hoffberg | G06Q 30/0282 463/1 |
| 2010/0321499 | A1 * | 12/2010 | Ortiz | H04L 69/329 348/157 |
| 2011/0098096 | A1 * | 4/2011 | Odom | G07F 17/329 463/17 |
| 2011/0270779 | A1 * | 11/2011 | Showalter | G06Q 40/02 705/36 R |
| 2012/0021814 | A1 * | 1/2012 | Gurovich | G07F 17/3206 463/16 |
| 2012/0071223 | A1 * | 3/2012 | Sharkov | G07F 17/3288 463/20 |
| 2012/0214575 | A1 * | 8/2012 | Amaitis | G06Q 50/34 463/25 |
| 2012/0295698 | A1 * | 11/2012 | Demino | G07F 17/3288 463/28 |
| 2013/0073389 | A1 * | 3/2013 | Heath | G06Q 30/02 705/14.54 |
| 2013/0079094 | A1 * | 3/2013 | Odom | G07F 17/32 463/25 |
| 2013/0090157 | A1 * | 4/2013 | Tharp | G07F 17/3223 463/25 |
| 2013/0102372 | A1 * | 4/2013 | Lutnick | G07F 17/3276 463/13 |
| 2013/0136818 | A1 | 5/2013 | Uehara et al. | |
| 2013/0157735 | A1 * | 6/2013 | Amaitis | G07F 17/323 463/6 |
| 2013/0211858 | A1 * | 8/2013 | Ohnemus | G16H 50/30 705/3 |
| 2013/0225282 | A1 * | 8/2013 | Williams | G07F 17/3241 463/29 |
| 2013/0316818 | A1 | 11/2013 | Earley et al. | |
| 2014/0057706 | A1 * | 2/2014 | Merrill | G07F 17/3244 463/25 |
| 2014/0094274 | A1 | 4/2014 | Guinn et al. | |
| 2014/0274264 | A1 | 9/2014 | Fine et al. | |
| 2014/0274321 | A1 | 9/2014 | Ulrich et al. | |
| 2014/0365415 | A1 * | 12/2014 | Stelfox | G06K 7/10227 706/21 |
| 2015/0149837 | A1 * | 5/2015 | Alonso | G06K 7/10366 714/57 |
| 2015/0221177 | A1 * | 8/2015 | Glancy | G07F 17/3223 463/25 |
| 2015/0262456 | A1 * | 9/2015 | Shore | G07F 17/3244 463/25 |
| 2015/0287265 | A1 * | 10/2015 | Lyons | G07F 17/3211 463/25 |
| 2015/0325081 | A1 * | 11/2015 | Johnson | G06Q 10/02 463/25 |
| 2016/0104347 | A1 * | 4/2016 | Yang | G07F 17/326 463/25 |
| 2016/0240045 | A1 * | 8/2016 | Doull | G07F 17/3223 |
| 2016/0267747 | A1 * | 9/2016 | Dengler | G07F 17/3244 |
| 2016/0358406 | A1 * | 12/2016 | Daly | H04N 21/4312 |
| 2018/0005492 | A1 * | 1/2018 | Hall | H04W 12/106 |
| 2018/0190077 | A1 * | 7/2018 | Hall | G07F 17/3225 |
| 2018/0204416 | A1 * | 7/2018 | Perea-Ochoa | G07F 17/3218 |
| 2019/0108232 | A1 * | 4/2019 | Calcaterra | G06F 21/50 |
| 2019/0122482 | A1 | 4/2019 | Amaitis et al. | |
| 2019/0143224 | A1 * | 5/2019 | Melissinos | A63F 13/35 463/42 |
| 2019/0236909 | A1 * | 8/2019 | Blayvas | G07F 17/3225 |
| 2019/0371129 | A1 * | 12/2019 | Hall | G07F 17/3223 |
| 2021/0192899 | A1 * | 6/2021 | Hall | G07F 17/3225 |
| 2022/0076540 | A1 * | 3/2022 | Hall | G07F 17/3269 |
| 2022/0406146 | A1 * | 12/2022 | Hall | G07F 17/3225 |

* cited by examiner

SYSTEMS AND METHODS FOR PROVIDING SECURE DATA FOR WAGERING FOR LIVE SPORTS EVENTS

CROSS-REFERENCES TO RELATED APPLICATIONS

The present invention is related to and claims priority from the following U.S. patent documents. This application is a continuation of U.S. patent application Ser. No. 17/192,410 filed Mar. 4, 2021, which is a continuation of U.S. patent application Ser. No. 15/903,343 filed Feb. 23, 2018, which is a continuation-in-part of U.S. patent application Ser. No. 15/636,297, filed Jun. 28, 2017, which claims the benefit of and priority from U.S. Provisional Patent Application No. 62/356,166 filed Jun. 29, 2016. U.S. patent application Ser. No. 15/903,343 is also a continuation-in-part of U.S. patent application Ser. No. 15/065,652 filed Mar. 9, 2016 which claims the benefit of and priority from U.S. Provisional Patent Application No. 62/130,438 filed Mar. 9, 2015. All the above-mentioned patent documents are incorporated herein by reference in their entirety.

BACKGROUND OF THE INVENTION

1. Field of the Invention

The present invention relates to systems and methods for generating and providing data for sports betting or wagering, and more particularly, for providing secure data from live sports events with applied analytics for use in sports betting or wagering during the live event.

2. Description of the Prior Art

Systems and methods for sports betting and management of sports data are well known in the prior art. Included in the prior art are synchronization of real-time sports betting line or odds data for sports books. Also included are audio video of live golf, or "in camera views", or historic audio and video, with wagering. Another area is in-play betting and methods or systems for randomized in-play betting (micro-betting). Yet another area is a secure server system for sports betting with a Kiosk.

Wagering on live events, such as sporting events, has traditionally involved bettors wagering on the outcome of a sporting event with a sports book (or "bookmaker"), with the outcome being balanced by odds or a spread or line. In addition, bettors may make "side bets" or "side wagers" involving various aspects of the sporting event, depending on the particular sport. For instance, a popular side wager in football and basketball is an "over/under" wager in which an individual bets on whether the total score in a game will be over or under a certain value set by the sports book. Accordingly, whether a bettor has won or lost a wager is conventionally determined after the sporting event has concluded. In contrast, in-play wagering involves wagering on events that occur within an active sporting event. For example, in a golf tournament, a bettor could wager on the drive distance of a participant; in a football game, a bettor could wager whether the next play will be a run play or a pass play; and in a downhill ski race, a bettor could wager on the split times for a participant along the course.

Conventional technology does not generally provide enough information about an active sporting event to allow for reliable in-play wagering. For instance, sporting event information is traditionally not recorded in chronological order in relation to the play-by-play (or "scoring") data within the sporting event. Accordingly, sporting event information concerning particular players, for example, is not segmented into activities that are specific to each play occurring within a sporting event. Without such segmented information, bettors are not able to reliably wager on sporting event outcomes of each individual play (i.e., because the result of a previously play may affect the odds of subsequent plays).

In addition, bettors and sports books alike do not have access to sufficient broadcast images of the sporting event to have an adequate degree of certainty as to the outcome of in-play events. For example, in many sporting events, certain activities may not be recorded and/or broadcast, particularly in real time or substantially real time. In addition, recorded and/or broadcasted activities may not be presented in true chronological order. The live television presentation of a golf tournament, for instance, may not be chronologically accurate. For instance, a television producer, for the purpose of trying to create a compelling storyline or to present the most captivating action in the most efficient way possible, may editorialize and present recently "taped" segments out of true chronological order without making the distinction between live and recently taped known to viewers. This lack of chronological video broadcasts may be problematic for bookmakers as live data about a sporting event may be collected and relayed by bettors via computing devices, such as a smartphone device, back to sports books to place a wager.

Consequently, what is needed is a technological solution supporting real time live event data and video feeds in true chronological order to increase the reliability and integrity of in-play wagering for both bettors and bookmakers.

Exemplary US Patent Documents relevant to the prior art include:

U.S. Pat. No. 8,057,300 for "Method and system for providing real time sports betting information" by Corbo, filed on Jan. 12, 2010 and issued on Nov. 15, 2015, describes a method and system for providing sports betting information, in real time, utilizing a standard Internet connection on a computer to display the odds from a plurality of sports books are provided. The system provides its users with a line seeker alert, a major line move alert, a bet tracker, and a fully customizable display.

U.S. Pat. No. 9,138,638 for "Golf game management and entertainment system integrating pre-game, in-game, and post-game content for enhanced golfing experience" by Bastawros, filed on Mar. 14, 2013 and issued on Sep. 22, 2013, describes golf game management integrating pre-game, in-game, and post-game activities for a golf game into a unified experience. A golf cart-mounted entertainment console includes video cameras, sensory devices worn by the players during the game, and locally-mounted data processing components for modeling collected data. A cart-mounted interface, web site, and mobile device application present game-related content that allows players to view and manipulate data before, during and after the game. Multiple data processing modules provide several functions built on data collected from playing a game of golf for players to enjoy an enhanced golf experience.

U.S. Pat. No. 8,734,231 for "Systems and methods for enabling remote device users to wager on micro events of games in a data network accessible gaming environment" by Shore, et al., filed on Jun. 15, 2011 and issued on May 27, 2014, describes a method and system for micro-betting. One or more micro-bets can be electronically placed with respect to one or more micro-events associated with an event during a round of micro-betting. One or more wages with respect to the micro-bet(s) can be managed and controlled during the round of micro-betting. The wager(s) can be managed and controlled remotely from electronically placing the micro-bet(s) during the round of micro-betting. Additionally, a portion of a profit can be automatically obtained with respect to the round of micro-bets in exchange for the aforementioned managing and controlling of the wager(s) with respect to the micro-bet(s) during the round of micro-betting.

US Publication No. 20100321499 for "Wireless transmission of sports venue-based data including video to hand held devices operating in a casino" by Ortiz, et al., filed on Sep. 1, 2010 and published on Dec. 23, 2010, describes venue-based data including video from cameras located at a sports venue can be provided to hand held devices operating in a casino. A casino patron hand held device enables the view sporting events provided to a hand held device from a server and placement of wagers. Venue-based data including video and statistics are received from server including inputs or visuals captured as video by at least one camera located within at least one sports venue. Venue-based data is processed at server for display on a display associated with at least one hand held device operating within a casino. Venue-based data is displayed on hand held devices, enabling casino patrons to view event video moving about the casino. Casino patrons can also gamble using said hand held device while viewing selected sporting events within the casino.

U.S. Pat. No. 8,029,362 for "Gaming device methods and apparatus employing audio/video programming outcome presentation" by Walker, et al., filed on Aug. 8, 2006 and issued on Oct. 4, 2011, describes in a first aspect, a method of operating a gaming device. The method includes the steps of (i) receiving audio/video content; (ii) associating a plurality of sets of outcome values with the audio/video content; (iii) determining a play session; (iv) determining which of the plurality of sets of outcome values to associate with the audio/video content for a duration of the play session, thereby determining an active set of outcome values; (v) determining a result of a game play during the session; (vi) selecting, based on the result, a value from the active set of outcome values; and (vii) outputting, as an indication of the result, the audio/video content and an indication of the selected value.

US Publication No. 20070082740 for "Sports gaming and entertainment network" by Stearns, et al., filed on Oct. 11, 2006 and published on Apr. 12, 2007, describes A sports gaming and entertainment system has a plurality of kiosks to allow customers to access legal sports gaming opportunities, obtain sports information, view different sporting events, and make sports related purchases. A secure server is coupled to the plurality of kiosks. The secure server sends selected information from an internet system to the plurality of kiosks to allow the plurality of kiosks to offer legal sports gaming opportunities, obtain sports information, view different sporting events, and make sports related purchases.

U.S. Pat. No. 7,534,169 for "System and method for wireless gaming system with user profiles" by Amaitis, et al., filed on Aug. 9, 2005 and issued on May 19, 2009, describes a gaming system. The gaming system allows users to access applications via gaming communication devices coupled to a communication network. At least a portion of the network may be wireless. The gaming applications include gambling, financial, entertainment service, and other types of transactions. The system may include a user location determination feature to prevent users from conducting transactions from unauthorized areas. The gaming system may incorporate a user profile feature according to which certain information regarding users of the system may be maintained. Such information can include, without limitation, information relating to preferences, finances, activities participated in by the users, and trends and habits of the users.

SUMMARY OF THE INVENTION

The present invention is directed to systems and methods for providing secure data from live sports event(s) with applied analytics for use in sports betting or wagering during the live sports event(s).

The systems and methods provide for real-time raw data acquired from a live sports event received by at least one server over at least one network, aggregation of inputs, application of statistics, visuals, graphics, scoring, environmental data, and combinations thereof to the raw data, analysis and applied analytics and rules engine(s) to the data for transforming the real-time raw data from the live sports event(s) for use with wagering or betting for or during the live sports event without misuse or misappropriation of any of the data during the live sports event.

These and other aspects of the present invention will become apparent to those skilled in the art after a reading of the following description of the preferred embodiment when considered with the drawings, as they support the claimed invention.

DETAILED DESCRIPTION

Figure 1:
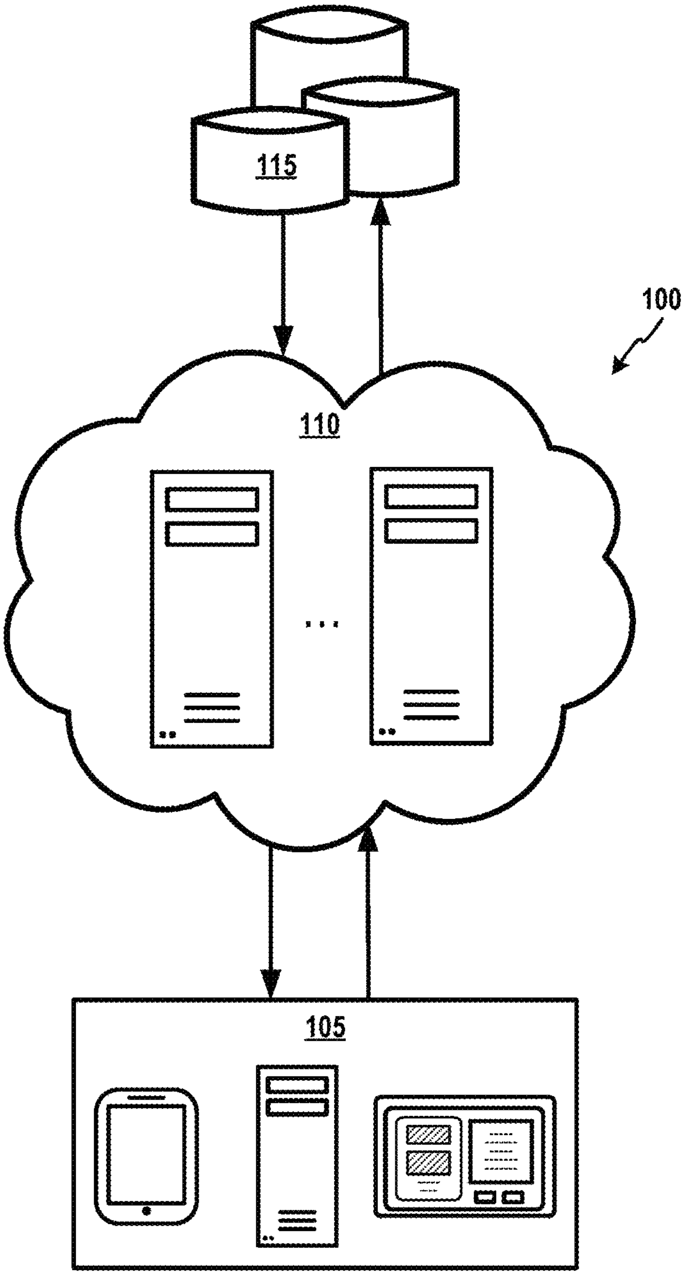
FIG. 1 depicts an illustrative in-play management system according to some embodiments.

The described technology generally relates to systems for monitoring live events. In some embodiments, a live event management system ("management system" or "system") may be configured to track in-play activities during a live event and to provide live event information to data consumers. In some embodiments, the described technology may be used for in-play live event wagering. In particular, the management system may be configured according to some embodiments to manage, synchronize, and present various forms of live event information to provide bettors and bookmakers with a reliable system for in-play wagers on live events. In some embodiments, the management system may be configured to aggregate, synchronize, and/or segment the various forms of live event information. In some embodiments, the management system may be configured to provide an event timeline in real time or substantially real time that may facilitate reliable in-play wagering using accurate and up-to-date information. In some embodiments, the event timeline may be used as a reference to review, manage, and monitor live events, wagers, and wager activity. In some embodiments, the management system may be an "end-to-end" wagering solution capable of, among other things, receiving wagers (or "bets") from bettors, managing and processing event information, and presenting wagers received from bettors to bookmakers.

A live event refers to an event occurring in real time which has not concluded in its entirety. Non-limiting examples of live events may include sporting events, elections, award ceremonies, weather conditions, games of chance, or the like. Illustrative sporting events may include, without limitation, a baseball game, a football game, a hockey game, a basketball game, a tennis match, a soccer match, a volleyball match, a cricket match, a rugby match, a lacrosse game, a race (for instance, a motor vehicle race, a bicycle race, a ski race, or a speed skating race), a track and field competition, a fighting match (for example, a boxing or a mixed martial arts match), and a fishing tournament.

For purposes of clarity, the systems and methods described herein are generally described with respect to a sporting event, such as a football game. However, those having ordinary skill in the art will recognize that the systems and methods are applicable to all live events, regardless of the type of event. In addition, although the management system may be described as relating to wagering, embodiments are not so limited, as the management system may be configured to monitor and provide live event information for other purposes.

Live event information refers to any type of information associated with a live event, including, without limitation, event media content, participant information, context information, and in-play opportunities. Event media content refers to any type of media recorded, broadcast, or otherwise created from the event. The media may include various forms of media alone or in combination, including video, audio, and textual media. For example, event media content may include a broadcast television feed of a golf tournament. In another example, event media content may include a plurality of camera feeds for a football game presented through the management system. In some embodiments, the event media content may include video content annotated with text, images, or the like. In some embodiments, the event media content may include social media content. In some embodiments, the event media content may be presented and/or consumed in real time or in substantially real time.

Participant information refers to information associated with participants of the event. For instance, for a sporting event, participants may include teams, players, and/or coaches. The participation information may relate to the actions, statistics, results, or the like associated with the live event participants. In some embodiments, the live event information may include media source information associated with the source of the media content including, without limitation, media equipment information, timestamp information, location information, media subjects (for example, participants recorded on the media), or the like. In some embodiments, the media source information may be embedded in and/or combined with the media content.

The participant information may generally include scores, plays, player and/or team live and historical statistics, object location and motion information, player location and motion information, player physiological information, biometric information, injury information, official clock events, and historical information.

Context information may generally refer to any information capable of providing context to the live event, such as the live event participants or the live event information. Illustrative context information may include weather conditions and/or forecasts, player injury information, event location (for instance, indicating home and away teams), bookmaker odds and/or spreads, off-the-field information that may affect the live event and/or participants, or the like.

In-play opportunities may generally refer to opportunities for wagering within a live event. The in-play opportunities may be specific for each type of live event. For instance, for a football game, in-play opportunities may include play selection, yards-from-scrimmage for a particular play, or the like. In a basketball game, an in-play opportunity may include the number of free throws a player will make. In some embodiments, the in-play opportunities may be dynamically generated by the system based on the particular situation of the game and, accordingly, may change as the game situation changes.

Wagering information may generally refer to any information associated with a wager placed by a bettor. Non-limiting examples of wagering information may include a live event, wager amount, time of wager, bettor information (for instance, name and address information, demographic information, account information, preference information, and historical information), bookmaker information (for example, business information and address information), in-play opportunity (for example, a wagering opportunity within a live event), payment information, odds, and a spread or line. The wagering information may include information used by a bettor to place a wager and/or information used by a bookmaker to receive, pay-out, or otherwise process a wager by a bettor.

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

In an embodiment, a live event management system may include a processor and a non-transitory, computer-readable storage medium in operable communication with the processor. The computer-readable storage medium may include one or more programming instructions that, when executed, cause the processor to receive live event information for a live event from at least one data source, generate at least one event timeline based on the live event information, the event timeline being configured to present at least one unit within the live event information in a chronological order, generate at least one in-play opportunity for the live event based on the at least one event timeline, gate wagering activity for the at least one in-play opportunity based on the live event information, receive at least one wager from a client computing device for the at least one in-play opportunity, and determine at least one wagering outcome of the in-play opportunity based on the live event information.

In an embodiment, a computer-implemented method for managing live event information may include, by a processor, receiving live event information for a live event from at least one data source, generating at least one event timeline based on the live event information, the event timeline being configured to present at least one unit within the live event information in a chronological order, generating at least one in-play opportunity for the live event based on the at least one event timeline, gating wagering activity for the at least one in-play opportunity based on the live event information, receiving at least one wager from a client computing device for the at least one in-play opportunity, and determining at least one wagering outcome of the in-play opportunity based on the live event information.

In an embodiment, an illustrative method for sports wagering may include a sport-specific aggregation operation for calculating and recording scoring and performance-related events and results, a wagering operation for managing and recording wagering events and results, and a video operation for recording video streams from one or more cameras which are capturing activity of a sports competition. In some embodiments, all events, activities, units, and/or the like may be recorded chronologically on a same event timeline, the event timeline being synchronized in time with each of the recorded video streams, and wagering events and results are presented and managed by using a combination of the recorded video streams and information provided by the aggregation method.

In various aspects, the event timeline may be automatically synchronized, in real time, to each of the recorded video streams, in a frame-accurate manner. In some embodiments, each camera may be simultaneously capturing a different view or area of activity involved within the sports competition. In some embodiments, a plurality of users may each place individual wagers on an outcome of at least a subset of scoring and performance-related events. In various aspects, a plurality of users may be automatically presented with a plurality of available wagers based on information provided by the sport-specific aggregation method and/or the wagering method configured according to some embodiments. In various aspects, a plurality of users is automatically presented with the odds for each available wager and the odds for each available wager are calculated using information provided by the sport-specific aggregation operation and/or the wagering operation configured according to some embodiments. In some embodiments, each individual wager is only allowed to be placed prior to the actual time at which the corresponding scoring or performance-related scoring event occurs.

In some embodiments, a time interval for the allowance of a particular wager may be determined based on information provided by the sport-specific aggregation operation, and that time interval is used by the wagering operation to limit the ability of an individual user to place that particular wager. In various aspects, the time interval may be determined dynamically based on the context of the sports competition, and the time interval may vary during the sports competition.

In some embodiments, the results of each individual wager may be reported to each user within a short time interval after a completion of the scoring or performance-related event. In various aspects, the wagering operation may log the wagering activity of each individual user in such a manner that wagering activity of each individual user may be reviewed either in real time or after a live event, such as a sports competition, is complete. In some embodiments, the wagering activity of each individual user may be reviewed simultaneously with any or all of the recorded video streams in a synchronous fashion.

In some embodiments, the wagering operation may include disabling any offered wager. Disablement of an offered wager implies that no user may place that wager. In various aspects, disablement may be performed manually. The decision process to disable any offered wager may include reviewing the event timeline and recorded video streams simultaneously and in a synchronous fashion. In various aspects, disablement may be performed automatically based on information provided by the sport-specific aggregation operation and/or the wagering operation.

In some embodiments, the wagering operation may include enabling an offered wager. In some embodiments, enablement of an offered wager implies that every user may place that wager. In various aspects, enablement may be performed manually. The decision process to enable an offered wager may include reviewing the event timeline and recorded video streams simultaneously and in a synchronous fashion. In various aspects, enablement may be performed automatically based on information provided by the sport-specific aggregation operation and/or the wagering operation.

In some embodiments, the wagering operation may include cancelling an individual user's wager, even after the corresponding scoring or performance-related event has occurred. In some embodiments, cancelling a user's wager implies that the user may neither collect winnings nor lose money based on the outcome of that wager. In some embodiments, the decision to cancel an individual user's wager may include reviewing the event timeline and recorded video streams simultaneously and in a synchronous fashion.

In some embodiments, the scoring and performance-related events and results may include events and results based on spatial tracking of objects. In some embodiments, the objects may include, without limitation, a player, a ball, a playing surface, an official, a referee, and/or an umpire. In some embodiments, the scoring and performance-related events and results may include official clock events. In some embodiments, the scoring and performance-related events and results may include official scoring events and results that are manually input by a user. A manually entered event timestamp may be synchronized to the recorded video streams such that any delay in the manual entry is not reflected in the timeline. In some embodiments, the scoring and performance-related events and results may include official scoring events and results that are automatically determined by the sport-specific aggregation operation.

In some embodiments, the scoring and performance-related events and results may include events and results based on tracking biometric data of players. In some embodiments, the biometric data may include, without limitation, a heart rate or a blood pressure.

The present invention provides systems and methods for providing secure data from live sports events with applied analytics for use in sports betting or wagering on the live sports event, particularly in-play betting and/or event-based and/or outcome betting. The IDS PGA Tour Scoring System Functional Specification 4.0 (Final) dated May 8, 2000; IDS PGA Tour Scoring System Download File Specification 1.0 dated Feb. 6, 2001; IDS PGA Tour Scoring Administration AcrView Integration Specification 1.0 dated Oct. 9, 2001; all published by Information & Display Systems of Jacksonville, FL, USA are incorporated herein by reference in their entirety, including description and figures.

In one embodiment of the present invention, a computing platform including at least one server or at least one processor coupled with memory is operable to collect and aggregate various data in real time from at least one live sports event, and is operable to securely communicate data over at least one network for use in wagering or betting on the at least one live sports event for in-play or event betting or cross-event betting during the corresponding at least one live sports event via an interactive graphic user interface (GUI) on at least one computing device having a display and input/output mechanisms and operable for network-based communication with at least one server associated with the platform.

In one illustrative example, a live golf event is monitored with video and/or audio inputs received from a multiplicity of sensors, video cameras, and/or input capture devices that are constructed and configured to capture inputs for at least one aspect of the live golf event for at least one player, for providing live golf raw data of the live golf play in real time to the computing platform, wherein at least one of statistical information, graphics, scoring is applied to the live golf raw data, thereby transforming the live golf raw data into analyzed or transformed live golf data and transmitting the analyzed live golf data to a platform for use in generating markets or odds-making for use with wagering or betting, and providing a platform for offering and receiving bets for the at least one live golf event for in-play and/or event betting via an interactive GUI on at least one computing device having a display and input/output mechanisms during the corresponding live golf event, wherein the betting is based upon real time data or delayed data available for in-play betting.

In one embodiment, at least one sensor is provided on or associated with at least one golf player and is operable to track location data for the at least one player on the golf course during the live golf event. The at least one sensor communicates its data to a coordinator or to at least one server of the platform of the present invention. Preferably, the at least one sensor is a Global Positioning System (GPS) sensor.

By way of example and not limitation, inputs to the platform include: location data for the at least one golf player, at least one of location data, distance data, trajectory data, position and lie, for a golf ball for each shot and each hole for each round of golf corresponding to each of the at least one players, at least one of distance data and trajectory data for golf ball travelled with each hit, velocity data for each swing, a type of club or club selection a golf player uses, number of shot, scoring summary, hole location, course and/or hole conditions, weather conditions including temperature, wind conditions, humidity conditions, and precipitation conditions, stance, type of shot, and other real-time data available for receiving as input(s) by the platform during the live golf event. Optionally, a portable or wearable device associated with the at least one player is operable to transmit real-time data as inputs to the platform wirelessly over at least one communications network, such as location data, biometric data, etc., where permissible by applicable rules. In another embodiment, at least one video camera is operable to capture live video data for the at least one golf player during the live golf event and transmit the live video data over at least one communications network to the platform at least one server or to a cloud-based platform. By way of example and not limitation, a camera is operable to capture at least one swing and at least one shot for the at least one golf player, in 3D or 2D format, and transmit it to the platform wherein at least one of statistical information, visual graphics or illustrations, audio, scoring, etc., are applied for transforming the raw golf data inputs to the system into analyzed data for use in betting or wagering during the live golf event, including in-play or event based bets.

The platform is further operable to provide analytics to the live golf event data, for example to automatically compare, match, and/or apply at least one rule of golf to at least one golf situation requiring application of a rule for determination of a penalty or a relief during the live golf event for at least one player.

The analytics platform is operable to collect or receive information and perform analytics including at least one factor associated with real-time environmental data for the live golf event, for example but not limited to, wind, temperature, humidity, visibility, precipitation, etc., in combination with the live golf raw data received. In one embodiment, the information is measurements which are performed by a weather station on site at the live golf event, where the weather station includes a thermistor, a thermocouple, a resistance temperature detector (RTD) probe, a hygrometer, a barometer, a rain gauge, an anemometer, and combinations thereof.

The analytics platform is operable to access various statistical data. In one embodiment, the statistical data comprise historical performance data and scoring data for each golf player and each round in the previous games. By way of example and not limitation, statistical data includes how many strokes, the farthest stroke, and/or the average distance of strokes a specific player made in the past week, month, year, or any other time period. By way of example and not limitation, statistical data includes percentage of putts made, percentage of putts made from various distances, tendencies to make or to miss shots compared with a target, average and/or longest and/or shortest distance from the hole on approach shots from various yardage ranges during a certain period of time. Additional factors and/or attributes within the platform include player, tournament, match, matchplay, course, round, hole, pin location and description, course conditions, weather conditions, location, shot location, shot lie or location description, club, stance, stroke, shape of shot, distance, time of day, and/or day of week.

Additionally, the statistical data preferably includes vital data for the at least one golf player. The vital data includes at least one of: biometric data, personal factors or attributes, health data. Examples of biometric data include one or more of: hydration, heart rate, fatigue, blood pressure, body temperature, blood sugar level, blood composition, alertness, etc. Vital data also preferably includes personal and emotional factors that might affect or have previously affected the performance of a golf player, by way of example and not limitation, family matters within a certain period before or after the live golf event, such as a wedding, a funeral, birth of a child, etc.

The analytics platform is operable to perform intelligent analytics based on the real-time golf data, real-time environmental data, and statistical data, and provide in-depth understanding and predictive analytics for the at least one golf player's performance. The generated analytics data generated by the analytics platform can be used in different applications, for example but not limited to, broadcasting, training or coaching, fan enhancements, spectator engagement, interactive gaming, determining odds or markets for betting or wagering, and for use with in-play or live event based betting or wagering during the live golf event.

The present invention includes a golf betting platform, including a sportsbook, for receiving via interactive GUI inputs received over at least one communications network bets or wagers on at least one aspect of the at least one live golf event or any portion thereof. Sportsbooks include betting on, but are not limited to, golf, tennis, football, basketball, baseball, hockey, soccer, horse racing, boxing, and mixed martial arts. By contrast to traditional sportsbooks and the prior art, the present invention provides for systems and methods using a live sports wagering platform that includes security and ensures data integrity by providing a closed system including the live raw data, the analytics platform, and network-based communication therewith, wherein the real time raw data, statistics, analytics, bookmaking, and interactive graphical user interface (GUI) for offering and receiving bets from at least one user in a legal betting geographic area are integrated to provide a secure experience and to eliminate misuse or misappropriation of the live event raw data and any associated analytics. The closed system receives input for betting over secure communications network through secure interactive GUI(s) accessible only to authenticated user(s) in compliance with at least one rule automatically applied by the system to ensure legal and authorized activity, for example by a rules engine operable on the platform.

By way of example and not limitation, the foregoing is provided for a live golf event as the live sports event.

Data from the live sports event transmitted over the at least one network is provided with data completeness (i.e., no missing data elements), data timeliness (i.e., real time or near real time, such as by way of example less than about 10 seconds), data accuracy (comparison to original state before transmission or communication over the network), scoring accuracy for all holes, and groupings of multiple players for the round which are delivered within a predetermined time. The raw data obtained from one or more sensors or input sources in real time from the live golf event for the players is aggregated, and combined with at least one of visual graphic elements, statistics, scoring, analytics, either before transmission from the at least one server via the at least one network to at least one computing device having the interactive GUI for pre-betting functions and analytics, including but not limited to setting odds or market making, and/or for receiving bets or wagers for at least one factor or attribute for in-play and/or for the live golf event.

Also, preferably, global positioning system (GPS) or other location systems or geofencing systems are used to provide for security and rules application to prevent or preclude or delay any betting inputs on live sports events received from a computing device having the interactive GUI for placing bets active thereon, from operating within a predetermined distance of the live sports event. Additionally or alternatively, time-based coding or stamping of bets for in-play betting are provided automatically by the system, in particular for in-play betting. By way of example and not limitation, in-play betting options require additional rules application automatically to avoid any possibility of misappropriation or misuse of the live sports event data applied to wagering.

The rules engine of the platform provides for delay or lag in live event raw data release (i.e., not in real time or near real time) for security and compliance with rules for in-play betting, e.g., penalty shots on soccer goal, live golf events, etc. For example, live golf events provide for delay from real time or near real time broadcasting of live video feed or web-based posting of live video feed, as with commercially available live golf video provided with ShotLink technology offered by PGA Tour developed by Information & Display Systems and SportsMedia Technologies.

In one embodiment, the present invention includes a secure closed system of live sports event betting. The bets received include one or more of simple wagers, moneyline bets, spread betting, proposition bets, parlays, progressive parlays, teasers, if bets, run line (puck line or goal line), future wagers, head to head, totalizators, 2$^{nd}$ half bets, in-play betting. In this embodiment, a bookmaker function operates as the intermediary between betters. The bookmaker function of the systems and methods accepts wagers, maintains a spread, and determines who has won and who has lost.

In the present invention, odds are set using statistics collected and/or generated from the platform, preferably within the closed system, and more preferably the odds are set after analytics apply the statistical information to the live event raw data. The odds are presented in formats including but not limited to at least one of decimal, fractional, and moneyline odds. In a closed system, the live sports events betting platform provides the bookmaker or sportsbook functionality.

Bets are registered with the system on or after being placed. For security purposes, bet registration may be delayed or rejected based upon the rules engine, for example, for certain types of betting, such as in-play betting and/or negative betting, such as missing a put in a live golf event.

One embodiment of the present invention is a closed system including at least one server and at least one database operable for network-based communication with at least one computing device with an interactive GUI. By way of example and not limitation, the GUI can function on a tablet computer, a wireless computing device, mobile phone, smart phone, personal computer, laptop computer, or any machine having a display and a microprocessor coupled with memory and operable for network-based communication with the at least one server.

In one embodiment, the systems and methods include cloud-based computing or virtual computing systems. Although 'cloud computing' can generically be applied to any software as a service or to services interfacing through the Internet, in the present invention, 'cloud-based' computing refers to distributed computing among at least one server or more than one server over at least one communications network.

In one embodiment, the closed system in the present invention is a decentralized platform built with blockchain technology. The decentralized platform is operable to generate odds, record bets, validate betting results, and automate transactions. Smart contracts are deployed to execute betting processes automatically on the decentralized platform. The blockchain-based decentralized platform provides secure betting process and ensures data integrity in live sporting events. In another embodiment, the blockchain-based decentralized platform also provides cryptocurrency to facilitate betting transaction, rewarding, fee payment, and etc. Especially, micropayment enabled by the cryptocurrency makes transactions much more convenient for betting participants than traditional payments do.

The present invention is inextricably tied to computer-based technology. A platform in the present invention collects, processes and analyzes live data input from a live sporting event in real time or near real time, generate odds for betting, accepts bets from authorized users via network communication in real time or near real time, and determines a result for betting for the live sporting event. These steps in the present invention could not be performed before the internet or computer technology, nor can these steps be performed using only mental processes. Further, the present invention is a closed system for data collecting and analyzing, odds making and bookmaking with data security and integration provided by applying geofencing systems, GPS or other location systems, and rules engines for the live sporting event. None of those functions and/or features provided by the platform is not well-understood, routine or conventional.

FIG. 1 depicts an illustrative management system according to some embodiments. As shown in FIG. 1, the management system 100 may include one or more server logic devices 110, which may generally include a processor, a non-transitory memory or other storage device for housing programming instructions, data or information regarding one or more applications, and other hardware, including, for example, the central processing unit (CPU) 305, read only memory (ROM) 310, random access memory (RAM) 315, communication ports 340, controller 320, and/or memory device 325 depicted in FIG. 3 and described below in reference thereto.

In some embodiments, the programming instructions may include an in-play live event management application (the "management application" or the "application") configured to, among other things, manage and present live event information, wagering information, in-play opportunities, and/or combinations thereof. The server logic devices 110 may be in operable communication with client logic devices 105, including, but not limited to, server computing devices, personal computers (PCs), kiosk computing devices, mobile computing devices, laptop computers, smartphones, personal digital assistants (PDAs), global positioning system (GPS) devices, televisions (i.e., "smart" televisions), printing devices, tablet computing devices, in-car entertainment (ICE) systems, any other logic and/or computing devices, and/or content presentation devices.

In some embodiments, the management application may be accessible through various platforms, such as a client application, web-based application, over the Internet, and/or a mobile application (for example, a "mobile app" or "app"). According to some embodiments, the management application may be configured to operate on each client logic device 105 and/or to operate on a server computing device accessible to client logic devices over a network, such as the Internet. All or some of the files, data and/or processes used by the management application may be stored locally on each client logic device 105 and/or stored in a central location and accessible over a network (e.g., the Internet or on server logic devices 110). In some embodiments, bettors and/or bookmakers may interact with the management application and/or each other through the client logic devices 105. In some embodiments, users may input various preferences through a mobile app, such as favorite teams, favorite sports, favorite in-play opportunities, betting preferences, or the like. In some embodiments, the management system 100 may be configured to obtain user information through accounts required for users to use a client logic device 105, for instance, through a mobile app, to access and use the management system. In some embodiments, a user may watch or otherwise access a live event through the management system. For instance, a user may view a sporting event via a video feed presented through the management system 100 platform.

The management application may be configured to receive event information from various data sources 115 relating to various live events, for example, simultaneously and in real time or substantially in real time. The management application may operate to generate an event timeline by processing the event information in chronological order, for example, in relation to the "scoring," activity, and/or "play-by-play" timeline of the live event. In some embodiments, the management application may generate one or more separate timelines for the various forms of event information. Non-limiting examples of event timelines may include team event timelines, player event timelines, game event timelines, context timelines, media content timelines, or the like. In some embodiments, an event timeline may include at least one graphical user interface ("GUI") object that may be presented on a display of a client computing device.

The data sources 115 may include media content sources, such as, without limitation, broadcast media, streaming media, camera feeds, media accessed over a network, and/or the like. In some embodiments, the media content sources may be configured to provide all or substantially all of the relevant action from a live event. In some embodiments, the management application may be configured to analyze the media content to determine actions, participants, or the like that are included in the media content. For instance, the management application may be configured to determine which teams are playing and/or a particular action (for example, a golf shot in a golf tournament or a field goal attempt in a football game) in a live event based on content recognition techniques. In some embodiments, the management application may be configured to analyze the media content based on the event information to determine whether any live event action is not available and/or has occurred. For example, for a golf tournament, the management application may determine that Player A has taken 40 strokes based on the event information, but the media content only recorded 39 strokes. Accordingly, the management system 100 may inform the bookmaker that the media content is missing 1 stroke for Player A. In another example, the management application may have generated a field goal in-play opportunity and may analyze the real time or substantially real time media content to determine whether the field goal attempt has occurred.

In some embodiments, the management application may segment or generate "chunks" of the event information that are specific to one or more units (or "actions," "plays," and/or the like) within the live event. In some embodiments, the event timeline may include the segments. For example, a unit may be a play in a football game or a stroke in a golf tournament or any other divisible element or action of a live event. Accordingly, the management application may segment the event information, such as the participant information, for a football game for each play within the game. In this manner, a bettor may wager on in-play opportunities based on outcomes of each individual unit (or play). In some embodiments, the units may be grouped, sub-grouped, and/or aggregated. For example, in a baseball game, individual pitch units may be aggregated by inning and/or by batter; in a football game, plays may be aggregated according to drives by each team (offensive or defensive); in a golf tournament, strokes may be grouped by round, hole, location, context, player, nationality, distance, club, handedness, or the like. For instance, in a round of golf, there may be an average of 72 wagering opportunities (strokes) for each golfer during each round.

In some embodiments, the event information for a live event may be synchronized with the media content for the live event. In some embodiments, the event information may be synchronized with the media content, such as video content, in a frame-accurate manner. For instance, the participant information for a football game may be synchronized with the actual media content (i.e., video footage) of the game to generate information-synchronized media content. Accordingly, a bookmaker using the management application may verify wager outcomes (for instance, the drive distance of Player A from the 8.sup.th tee in a golf tournament) by viewing the action as provided in the media content in relation to the participant information for the action, which may be achieved, for example, by viewing the information-synchronized media content.

In some embodiments, the management application may be configured to generate in-play wagering opportunities (or "in-play opportunities"). The in-play opportunities may include in-play information configured to define the in-play opportunities, such as, without limitation, a participant, an action, a unit, odds, enabled/disabled bettors, and a spread or line. For instance, a football game in-play opportunity may include a team and a play selection (for example, run or pass), a receiver route (for example, an out pattern, a post route, or the like), where a player will line up on the line of scrimmage for a particular play, or the like. In another instance, a baseball game in-play opportunity may include an at-bat unit for a player and the outcome of the at bat (for example, hit, strike out, walk, hit by pitch, on-base by wild pitch, on-base by passed ball, or the like). In some embodiments, certain in-play opportunities for sporting events may be standard based on the sport. In some embodiments, in-play opportunities may be generated dynamically based on the event information. For example, in a football game, an in-play opportunity concerning whether a running back will rush for more than 100 yards may be generated responsive to the player rushing for 80 yards. In another example, in a baseball game live event, an in-play opportunity of whether a player will pitch a no-hitter may be enabled once the player has pitched seven innings without giving up a hit. In addition, the in-play information may be modified based on the event information. For instance, for the no-hitter in-play opportunity example, the odds associated with the in-play opportunity may change based on the inning, the hitter, the number of pitches thrown, or the like.

In view of the dynamic and time-based nature of live events, the management application may be configured to "gate" the wagering activity associated with an in-play opportunity by specifying time intervals between which wagers are allowed and/or specifying when wagering will open (i.e., "opening gate") and will close (i.e., "closing gate"). In some embodiments, an in-play opportunity gate may be established based on the event information, such as the real time receipt of scoring and performance events by the management application. In some embodiments, gates may be based on standard intervals that occur in each particular sport, such as the time lapse between a golfer's shots, time between batters for a baseball pitcher, time between plays for a football team, or the like. In some embodiments, the management application may prevent bettors from wagering on in-play opportunities outside of the gates. In this manner, reliable and predictable wagering windows may be presented to a bettor, and the bookmaker can ensure that wagers are not made after an action has occurred.

In some embodiments, the data sources 115 may include external information that is not obtained from the live event. Illustrative and non-restrictive examples of external information sources may include information from social networks (for example, FACEBOOK), content feeds (for example, TWITTER), content services (for example, INSTAGRAM), news sources, crowd sourcing sites, polls, odds information sources, third party databases (for example, historical information such as information from the Elias Sports Bureau), or the like. In some embodiments, the management application may use the external information sources to generate the in-play opportunities, the opportunity information, gates, or the like. For instance, the odds associated with an in-play opportunity may be modified based on crowd sourcing information, social media posts, and/or polling results. In some embodiments, the management application may include information from the external information source in the event timeline.

Figure 2:
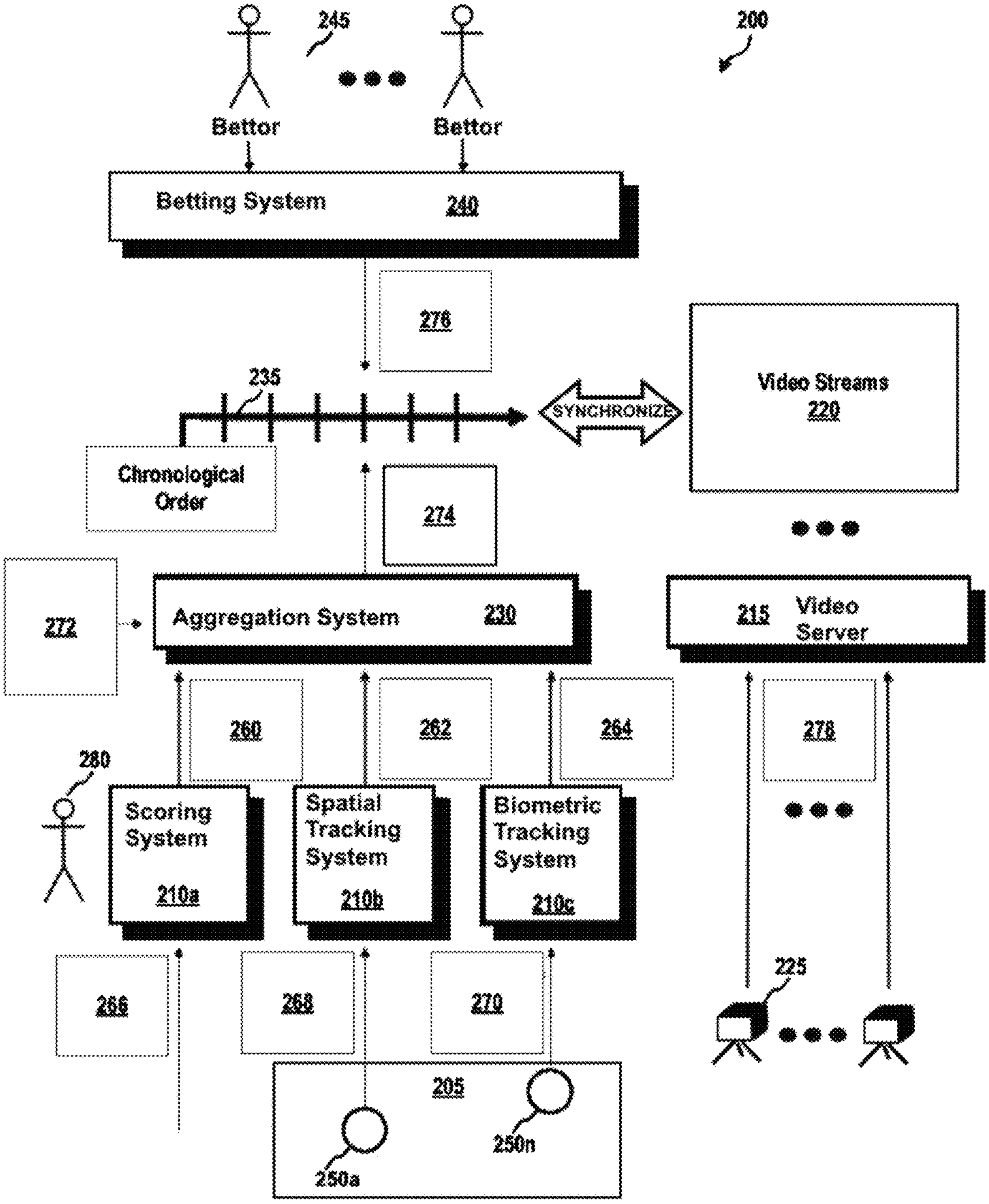
FIG. 2 depicts an illustrative in-play management system according to some embodiments.

FIG. 2 depicts an illustrative management system according to some embodiments. As shown in FIG. 2, the management system 200 may include event information systems 210*a-c* configured to generate event information from an event occurring at a competition area 205. In some embodiments, the event information systems 210*a-c* may be operated automatically and/or by an official scorer 280. In some embodiments, the management system 200 may be configured to execute a management application according to some embodiments. In some embodiments, as shown in FIG. 2, the management system 200 may be configured to provide a complete end-to-end solution for bookmakers to receive wagers from bettors.

A scoring system 210*a* may be configured to receive scoring information 266 and to provide various scoring data inputs, including team scores, time or game segment (for instance, inning, quarter, or period) information, manual play-by-play data, and automated scoring data 260. A spatial tracking system 210*b* may be configured to provide information associated with one or more participants 250*a-n* within the competition area 205, such as participant location, velocity, and/or direction 262. The spatial tracking system 210*b* may be used to track spatial data 268 including, without limitation, the location, velocity and direction of players, referees, the ball, and other physical landmarks via various sensors or other tracking technology including, without limitation global positioning satellite (GPS) devices, near field communication (NFC) devices, or the like. A biometric tracking system 210*c* may be configured to track various biometric data inputs 270 such as physiological and other biometric information of a participant 250*a-n*. The biometric data inputs 270 may include, without limitation, heart rate, blood pressure, or the like. The biometric tracking system 210*c* may be configured to provide biometric data 264 based on the biometric data inputs 270.

A media server 215, such as a video server, may be configured to receive media content 278 associated with the live event. In some embodiments, the video server 215 may receive video media content from multiple cameras 225. In some embodiments, at least a portion of the cameras 225 may be configured to capture a different view or angle of the live event action. In some embodiments, the video server 215 and/or the management application may be configured to generate various video streams 220 for use within the management system 200. In some embodiments, the video streams 220 may be customized based on various factors, such as user input, user preferences, event information, or the like. In some embodiments, at least a portion of the video accessed by the video server 215 may be obtained from third-party sources, such as national broadcast feeds. In some embodiments, at least a portion of the video accessed by the video server 215 may be obtained from video cameras operated, leased, accessed, or otherwise available to the management system 200. For instance, a competition area 205, such as a stadium, may provide access to video streams from cameras 225 arranged around the competition area. In another instance, the competition area 205 may allow an entity operating or associated with the management system 200 to install or otherwise operate cameras 225 located within the competition area.

The management system 200 may include an aggregation system 230 configured to aggregate information from the relevant information sources, including event information from the scoring system 210*a*, the spatial tracking system 210*b*, the biometric tracking system 210*c*, external data sources 272 (for instance, event and/or fan data, weather, social network content, and/or the like), and/or the like. The aggregation system 230 may be configured to aggregate the information and/or to perform calculations based on the information to generate event information 274, including sport-specific scoring and performance events for various live events simultaneously and in real time or substantially real time. The event information 274 may be synchronized with a corresponding video stream 220 to generate an event timeline 235 for each particular event.

A management system 240 may operate to present in-play opportunities (or "betting events") 276 to bettors 245 and to receive wagers for the in-play opportunities therefrom. In some embodiments, the management system 240 may be configured to receive and record wagers placed by the bettors 245. In some embodiments, the management system 240 may be configured to generate wager outcomes and to report them to the bettor 245 and/or the bookmaker associated with the wager. In some embodiments, a wager outcome may be reported to a bookmaker, and the bookmaker may review the event timeline 235 to confirm the wager outcome. The bookmaker may then approve the wager outcome for reporting and/or acknowledging to the bettor 245.

In some embodiments, the management system 240 may be configured to present the bettors 245 with the odds for each available in-play opportunity 276 wager. The management system 240 may be configured to implement the wagering gates according to some embodiments, including only allowing wagers to be placed prior to the actual time at which the corresponding scoring or performance-related event occurs.

In some embodiments, a monitor (or official) may be involved in the verification of event information 274 and/or wager outcomes. In some embodiments, in-play opportunities 276 and/or wagers placed thereon may be disabled, enabled, and/or canceled based on event information 274 and/or a review by the bookmaker and/or the monitor. In some embodiments, one or more bettors 245 may receive alerts, messages, or other communications indicating the status of an in-play opportunity 276. For instance, a bettor 245 accessing the system 200 through a mobile app may receive an alert that an in-play opportunity 276 has been enabled along with other corresponding information, such as the odds, the gate information, or the like. In some embodiments, the system 200 may be configured to determine which live events a bettor 245 is watching or is interested in and may enable and/or disable in-play opportunities 276 accordingly.

In some embodiments, disabling an in-play opportunity 276 means that no player may wager on the in-play opportunity. In some embodiments, the system 200 may be configured to enable in-play opportunities such that at least a portion of the bettors may wager on the in-play opportunity. In some embodiments, the in-play opportunity 276 may be selectively enabled for certain bettors 245, for example, based on groupings of the bettors, account status, historical activity, user preferences, which live events the bettor is watching, and/or the like. In some embodiments, the system 200 may allow for cancellation of any bettor's 245 wager, even after the corresponding scoring and performance-related event has occurred. In some embodiments, the result of cancellation may be that the bettor 245 may neither collect winnings nor lose money based on the outcome of that wager.

In some embodiments, enablement, disablement, and/or cancellation may be performed manually. For example, the decision process to enable, disable, or cancel any offered bet may include reviewing the event timeline and recorded video streams simultaneously and in a synchronous fashion. In some embodiments, enablement, disablement, and/or may be performed automatically based on information provided by the aggregation system 230 and/or the management system 240.

In some embodiments, the management system 240 may be configured to receive in-play opportunity suggestions from the bettors 245. In some embodiments, the system 200 may be configured to grant or deny the bettor-suggested in-play opportunities automatically based on past or current in-play opportunities (for instance, certain in-play opportunities may be generated by the system 200, but may not have been presented to the bettors 245) or by an administrator presented with the bettor-suggested in-play opportunity.

In some embodiments, the system 200 may be configured to include wager information on the event timeline 235. For example, the system 200 may provide a bookmaker with an event timeline 235 annotated with when and what type of wagers were placed by bettors 245 during the live event and/or the outcome thereof. In this manner, a bookmaker may be able to holistically examine the wagering activity during a live event. Such information may be used to provide and/or modify in-play opportunities in current and/or future live events.

Figure 3:
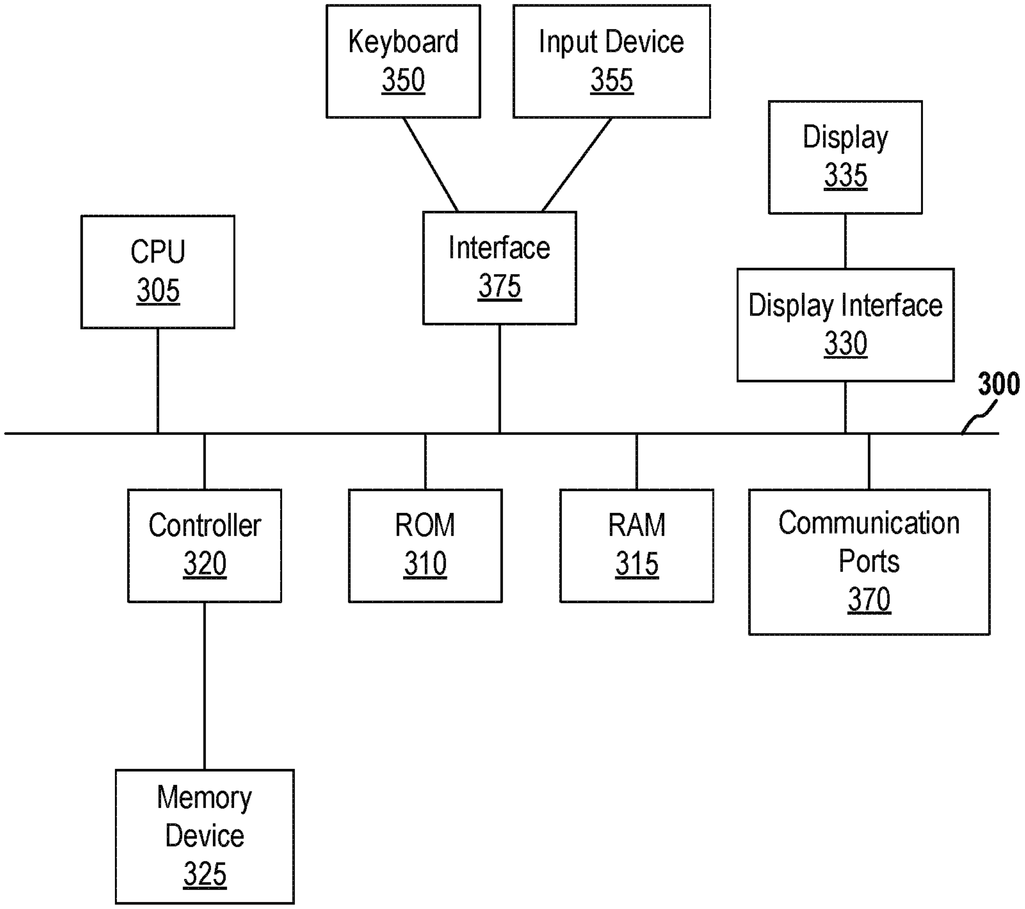
FIG. 3 illustrates various embodiments of a computing device for implementing the various methods and processes described herein.

FIG. 3 depicts a block diagram of exemplary internal hardware that may be used to contain or implement the various computer processes and systems as discussed above. A bus 300 serves as the main information highway interconnecting the other illustrated components of the hardware. CPU 305 is the central processing unit of the system, performing calculations and logic operations required to execute a program. CPU 305 is an exemplary processing device, computing device or processor as such terms are used within this disclosure. Read only memory (ROM) 310 and random access memory (RAM) 315 constitute exemplary memory devices.

A controller 320 interfaces with one or more optional memory devices 325 via the system bus 300. These memory devices 325 may include, for example, an external or internal DVD drive, a CD ROM drive, a hard drive, flash memory, a USB drive or the like. As indicated previously, these various drives and controllers are optional devices. Additionally, the memory devices 325 may be configured to include individual files for storing any software modules or instructions, auxiliary data, common files for storing groups of results or auxiliary, or one or more databases for storing the result information, auxiliary data, and related information as discussed above.

Program instructions, software or interactive modules for performing any of the functional steps associated with the determination, configuration, transmission, decoding, or the like of the presentation settings as described above may be stored in the ROM 310 and/or the RAM 315. Optionally, the program instructions may be stored on a tangible computer-readable medium such as a compact disk, a digital disk, flash memory, a memory card, a USB drive, an optical disc storage medium, such as a Blu-ray™ disc, and/or other recording medium.

An optional display interface 330 can permit information from the bus 300 to be displayed on the display 335 in audio, visual, graphic or alphanumeric format. Communication with external devices may occur using various communication ports 370. An exemplary communication port 370 may be attached to a communications network, such as the Internet or a local area network.

The hardware may also include an interface 375 which allows for receipt of data from input devices such as a keyboard 350 or other input device 355 such as a mouse, a joystick, a touch screen, a remote control, a pointing device, a video input device and/or an audio input device.

Figure 4:
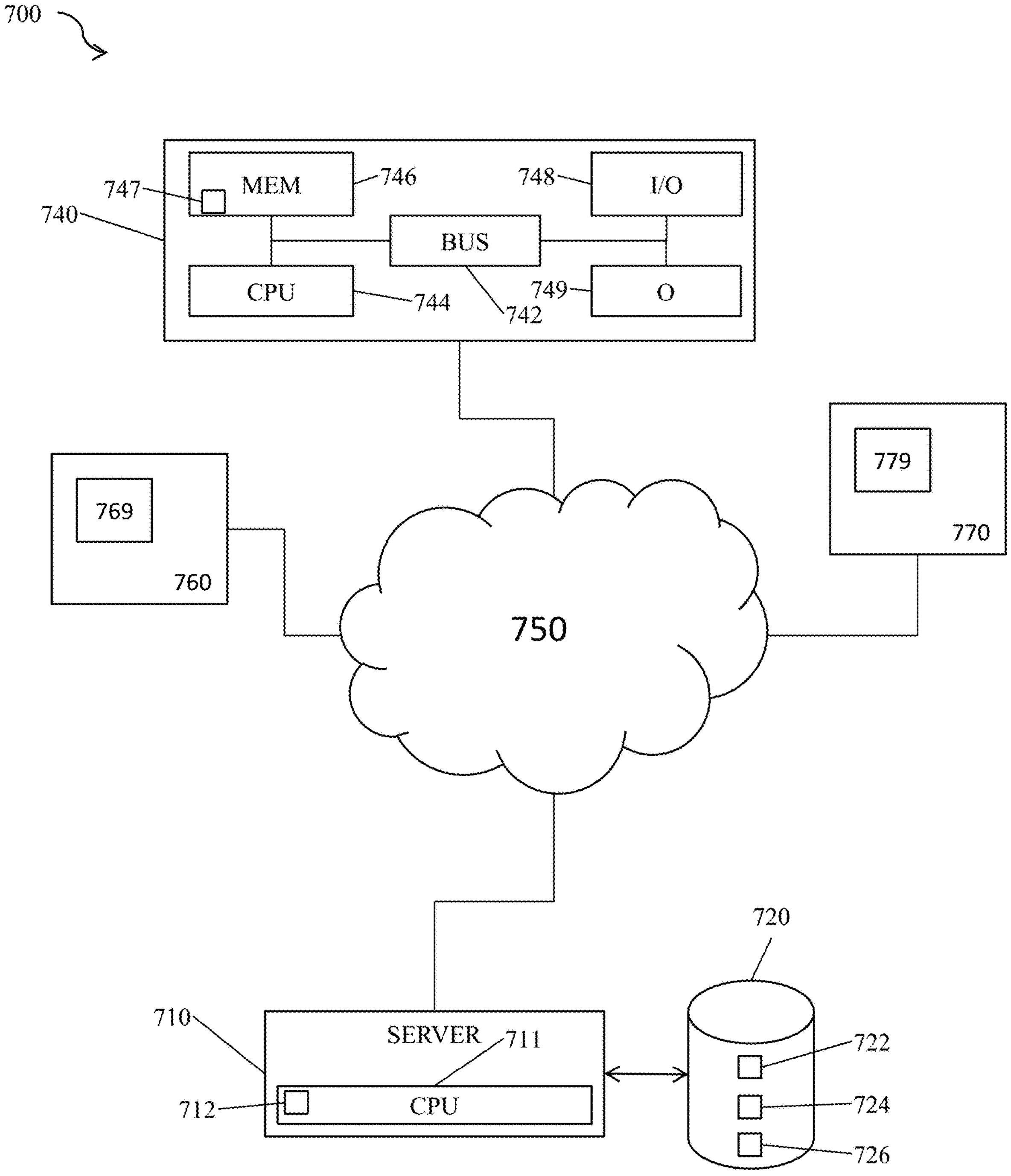
FIG. 4 is a schematic diagram illustrating a cloud-based system of the present invention.

Referring now to FIG. 4, a schematic diagram illustrating a cloud-based computing network used in of one embodiment of the invention for automated systems and methods is shown. As illustrated, components of the systems and methods include the following components and sub-components, all constructed and configured for network-based communication, and further including data processing and storage. As illustrated in FIG. 4, a basic schematic of some of the key components of a financial settlement system according to the present invention are shown. The system 700 comprises a server 710 with a processing unit 711. The server 710 is constructed, configured and coupled to enable communication over a network 750. The server provides for user interconnection with the server over the network using a personal computer (PC) 740 positioned remotely from the server, the personal computer having instructions 747. Furthermore, the system is operable for use with at least one or a multiplicity of remote computers, computing devices, or terminals 760, 770, having operating systems 769, 779 or software operable thereon. For example, a client/server architecture is shown. Alternatively, a user may interconnect through the network 750 using a user device such as a personal digital assistant (PDA), mobile communication device, or mobile computing device, such as by way of example and not limitation, a mobile phone, a cell phone, smart phone, tablet computer, laptop computer, wearable computing device, netbook, a terminal, or any other computing device suitable for network communication, whether wired or wireless. Also, alternative architectures may be used instead of the client/server architecture. For example, a PC network, or other suitable architecture may be used. The network 750 may be the Internet, an intranet, or any other network suitable for searching, obtaining, and/or using information and/or communications. The system of the present invention further includes an operating system 712 installed and running on the server 710, enabling server 710 to communicate through network 750 with the remote, distributed user devices. The operating system may be any operating system known in the art that is suitable for network communication as described hereinbelow. Data storage 720 may house an operating system 722, memory 724, and programs 726.

Figure 5:
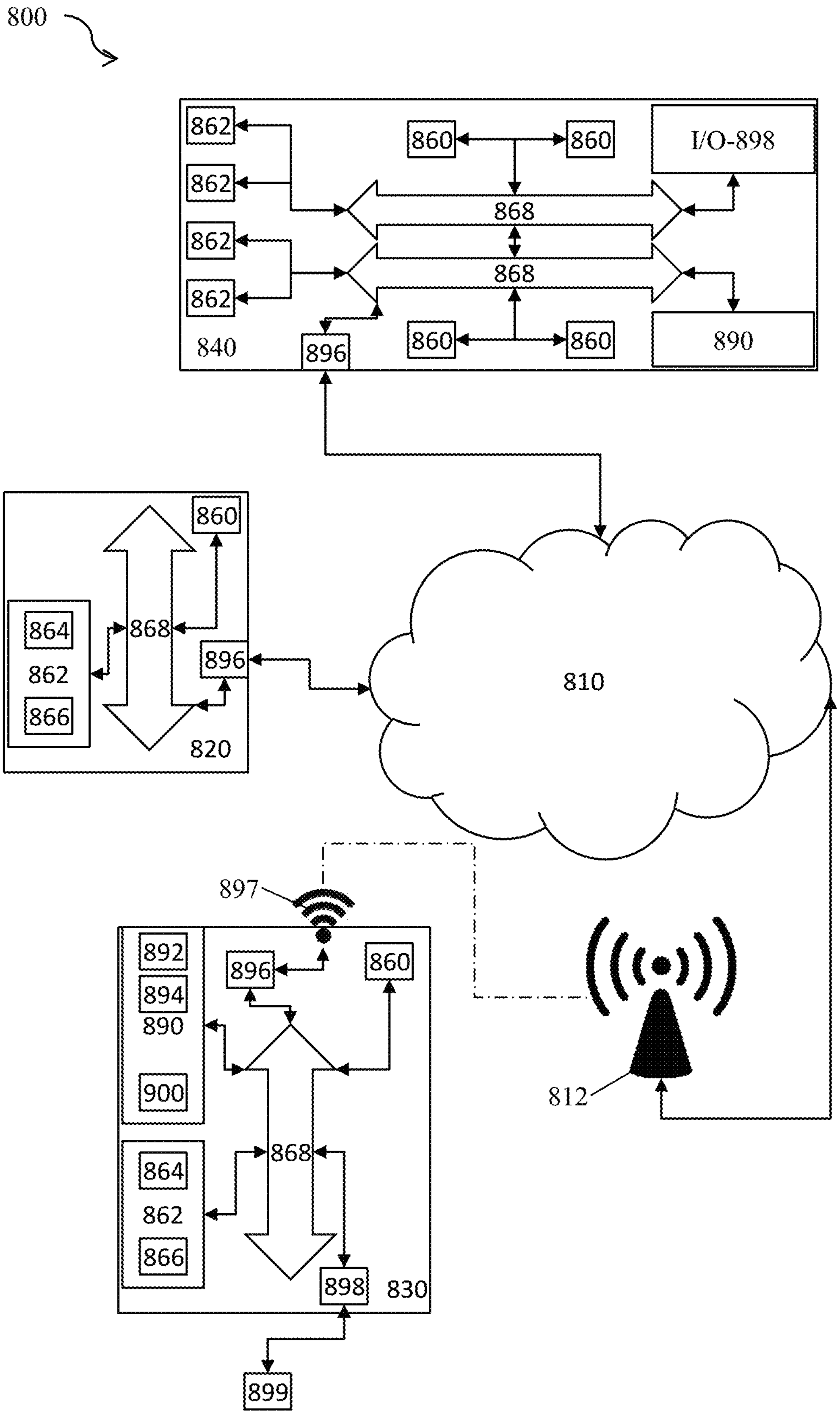
FIG. 5 is another schematic diagram illustrating a cloud-based system of the present invention.

Additionally or alternatively to FIG. 4, FIG. 5 is a schematic diagram of an embodiment of the invention illustrating a computer system and network, generally described as 800, having a network 810 and a plurality of computing devices 820, 830, 840. In one embodiment of the invention, the computer system 800 includes a cloud-based network 810 for distributed communication via the network's wireless communication antenna 812 and processing by a plurality of mobile communication computing devices 830. In another embodiment of the invention, the computer system 800 is a virtualized or cloud-based computing system capable of executing any or all aspects of software and/or application components presented herein on the computing devices 820, 830, 840. In certain aspects, the computer system 800 may be implemented using hardware or a combination of software and hardware, either in a dedicated computing device, or integrated into another entity, or distributed across multiple entities or computing devices.

By way of example, and not limitation, the computing devices 820, 830, 840 are intended to represent various forms of digital computers 820, 840, 850 and mobile devices 830, such as a server, blade server, mainframe, mobile phone, a personal digital assistant (PDA), a smart phone, a desktop computer, a netbook computer, a tablet computer, a workstation, a laptop, and other similar computing devices. The components shown here, their connections and relationships, and their functions, are meant to be exemplary only, and are not meant to limit implementations of the invention described and/or claimed in this document.

In one embodiment, the computing device 820 includes components such as a processor 860, a system memory 862 having a random access memory (RAM) 864 and a read-only memory (ROM) 866, and a system bus 868 that couples the memory 862 to the processor 860. In another embodiment, the computing device 830 may additionally include components such as a storage device 890 for storing the operating system 892 and one or more application programs 894, a network interface unit 896, and/or an input/output controller 898. Each of the components may be coupled to each other through at least one bus 868. The input/output controller 898 may receive and process input from, or provide output to, a number of other devices 899, including, but not limited to, alphanumeric input devices, mice, electronic styluses, display units, touch screens, signal generation devices (e.g., speakers) or printers.

By way of example, and not limitation, the processor 860 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated or transistor logic, discrete hardware components, or any other suitable entity or combinations thereof that can perform calculations, process instructions for execution, and/or other manipulations of information.

In another implementation, shown in FIG. 5, a computing device 840 may use multiple processors 860 and/or multiple buses 868, as appropriate, along with multiple memories 862 of multiple types (e.g., a combination of a DSP and a microprocessor, a plurality of microprocessors, one or more microprocessors in conjunction with a DSP core). Also, multiple computing devices may be connected via at least one network, with each device providing portions of the necessary operations (e.g., a server bank, a group of blade servers, or a multi-processor system). Alternatively, some steps or methods may be performed by circuitry that is specific to a given function.

According to various embodiments illustrated in FIG. 5, the computer system 800 may operate in a networked environment using logical connections to local and/or remote computing devices 820, 830, 840, 850 through a network 810. A computing device 830 may connect to a network 810 through a network interface unit 896 connected to the bus 868. Computing devices may communicate communication media through wired networks, direct-wired connections or wirelessly such as acoustic, RF or infrared through a wireless communication antenna 897 in communication with the network's wireless communication antenna 812 and the network interface unit 896, which may include digital signal processing circuitry when necessary. The network interface unit 896 may provide for communications under various modes or protocols.

In one or more exemplary aspects, the instructions may be implemented in hardware, software, firmware, or any combinations thereof. A computer readable medium may provide volatile or non-volatile storage for one or more sets of instructions, such as operating systems, data structures, program modules, applications or other data embodying any one or more of the methodologies or functions described herein. The computer readable medium illustrated in FIG. 5 may include the memory 862, the processor 860, and/or the storage media 890 and may be a single medium or multiple media (e.g., a centralized or distributed computer system) that store the one or more sets of instructions 900. Non-transitory computer readable media includes all computer readable media, with the sole exception being a transitory, propagating signal per se. The instructions 900 may further be transmitted or received over the network 810 via the network interface unit 896 as communication media, which may include a modulated data signal such as a carrier wave or other transport mechanism and includes any delivery media. The term "modulated data signal" means a signal that has one or more of its characteristics changed or set in a manner as to encode information in the signal.

Storage devices 890 and memory 862 illustrated in FIG. 5 include, but are not limited to, volatile and non-volatile media such as cache, RAM, ROM, EPROM, EEPROM, FLASH memory or other solid state memory technology, disks or discs (e.g., digital versatile disks (DVD), HD-DVD, BLU-RAY, compact disc (CD), CD-ROM, floppy disc) or other optical storage, magnetic cassettes, magnetic tape, magnetic disk storage or other magnetic storage devices, or any other medium that can be used to store the computer readable instructions and which can be accessed by the computer system 800.

It is also contemplated that the computer system 800 may not include all of the components shown in FIG. 5, may include other components that are not explicitly shown in FIG. 5, or may utilize an architecture completely different than that shown in FIG. 5. The various illustrative logical blocks, modules, elements, circuits, and algorithms described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application (e.g., arranged in a different order or partitioned in a different way), but such implementation decisions should not be interpreted as causing a departure from the scope of the present invention.

One or more communications protocols and/or methods for wired or wireless communications over the at least one network may be used with the present invention systems and methods.

The network-based communication can be wired or wireless using protocols such as, by way of example and not limitation, internet protocol (IP) including IPv4 and IPv6, cellular protocols 1G, 2G, 3G, 4G/LTE, and 5G, 802.11, Zigbee, Bluetooth, or others currently available or developed in the future. Also, by way of definition and description supporting the claimed subject matter, preferably, the present invention includes communication methodologies for messaging via a communication layer or for data transmission or communication over at least one network as described in the foregoing and in the following. IP-based communications over a network are most preferred for secure transmission, and for transmission of data having at least one of a security, a priority, a transport route, and content. Correspondingly, and consistent with the communication methodologies for transmitting or communicating data from the platform or at least one server, or within a closed system, as described hereinabove, according to the present invention, as used throughout this specification, figures and claims, the term "ZigBee" refers to any wireless communication protocol adopted by the Institute of Electronics & Electrical Engineers (IEEE) according to standard 802.15.4 or any successor standard(s), the term "Wi-Fi" refers to any communication protocol adopted by the IEEE under standard 802.11 or any successor standard(s), the term "WiMAX" refers to any communication protocol adopted by the IEEE under standard 802.16 or any successor standard(s), and the term "Bluetooth" refers to any short-range communication protocol implementing IEEE standard 802.15.1 or any successor standard(s). Additionally or alternatively to WiMAX, other communications protocols may be used, including but not limited to a "1G" wireless protocol such as analog wireless transmission, first generation standards based (IEEE, ITU or other recognized world communications standard), a "2G" standards based protocol such as "EDGE" or "CDMA 2000" also known as "1×RTT", a 3G based standard such as "High Speed Packet Access (HSPA) or Evolution for Data Only (EVDO), any accepted 4G standard such as IEEE, ITU standards that include WiMAX, Long Term Evolution "LTE" and its derivative standards, any Ethernet solution wireless or wired, or any proprietary wireless or power line carrier standards that communicate to a client device or any controllable device that sends and receives an IP-based message. The term "High Speed Packet Data Access (HSPA)" refers to any communication protocol adopted by the International Telecommunication Union (ITU) or another mobile telecommunications standards body referring to the evolution of the Global System for Mobile Communications (GSM) standard beyond its third generation Universal Mobile Telecommunications System (UMTS) protocols. The term "Long Term Evolution (LTE)" refers to any communication protocol adopted by the ITU or another mobile telecommunications standards body referring to the evolution of GSM-based networks to voice, video and data standards anticipated to be replacement protocols for HSPA. The term "Code Division Multiple Access (CDMA) Evolution Date-Optimized (EVDO) Revision A (CDMA EVDO Rev. A)" refers to the communication protocol adopted by the ITU under standard number TIA-856 Rev. A.

Figure 6:
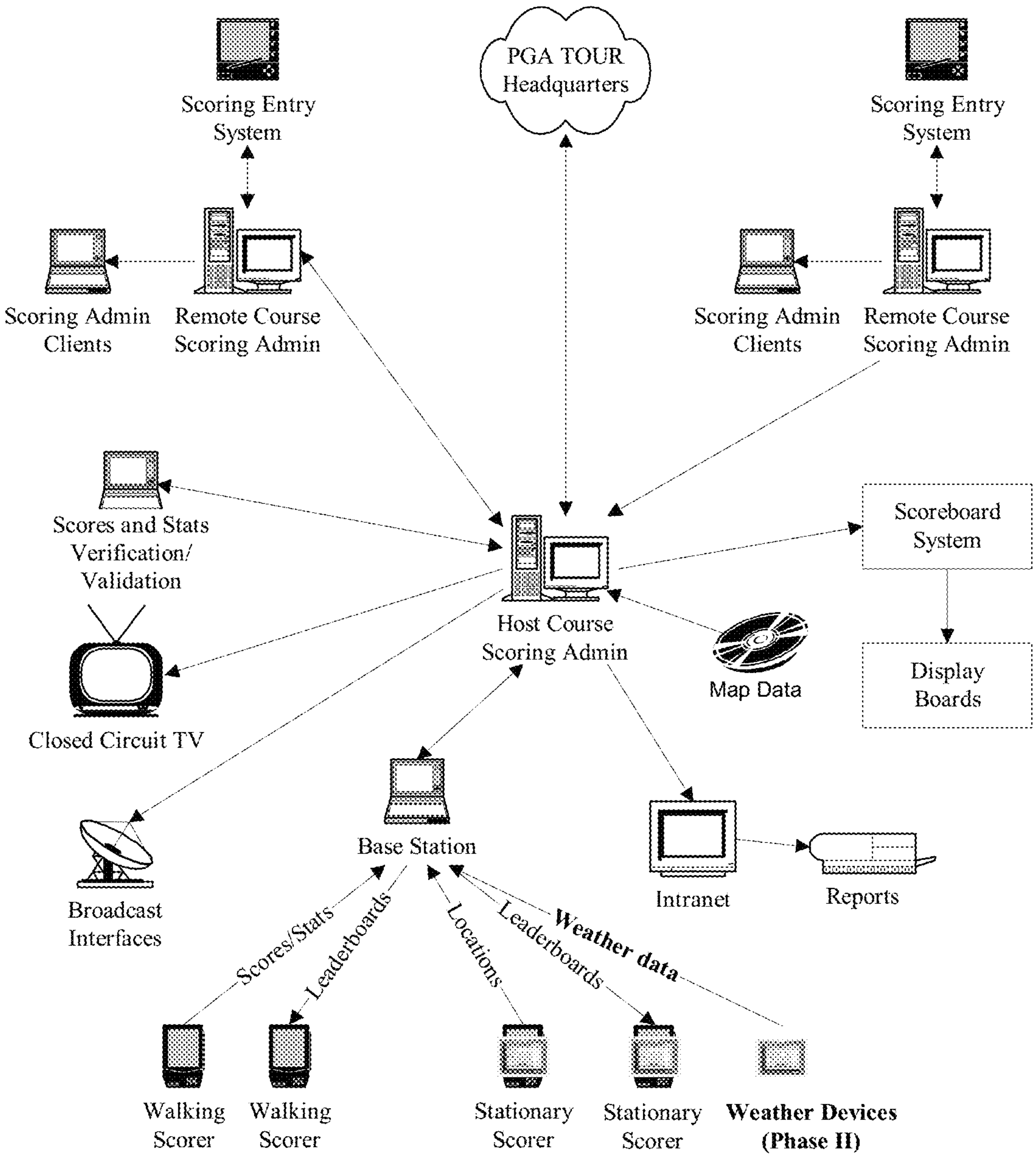
FIG. 6 is a schematic diagram illustrating select onsite system components for the live sports event.

FIG. 6 shows the connections between onsite system components in the context of a multi-course tournament. The components are preferably connected through network communication.

Figure 7:
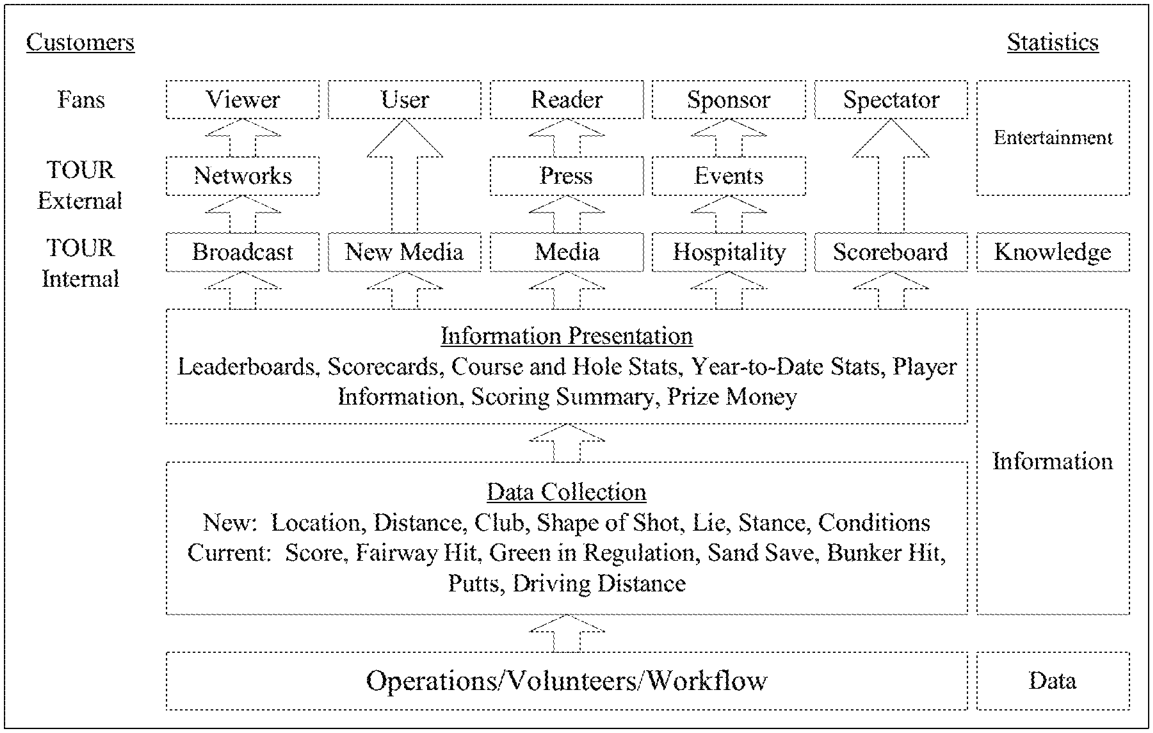
FIG. 7 is a flow diagram illustrating scoring system information flow.

FIG. 7 is a flow diagram illustrating scoring system information flow. FIG. 7 shows a flow diagram which illustrates the information flow for a scoring system. The system captures, presents, and/or analyzes score, location, distance, club, stance, lie, time stamp, shape of shot, weather conditions, and/or course conditions. Distance is captured alone or is derived from location information.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, et cetera. As a non-limiting example, each range discussed herein can be readily broken down into a lower third, middle third and upper third, et cetera. As will also be understood by one skilled in the art, all language such as "up to," "at least," and the like include the number recited and refer to ranges which can be subsequently broken down into subranges as discussed above. Finally, as will be understood by one skilled in the art, a range includes each individual member. Thus, for example, a group having 1-3 elements refers to groups having 1, 2, or 3 elements. Similarly, a group having 1-5 elements refers to groups having 1, 2, 3, 4, or 5 elements, and so forth.

Certain modifications and improvements will occur to those skilled in the art upon a reading of the foregoing description. While live golf event is described in detail of this specification, the present invention may include any live sports event or events, by way of example and not limitation, golf, football, basketball, rugby, baseball, soccer, hockey, cricket, volleyball, tennis, horse racing, boxing, mixed martial arts, and any other sports event or competitive event(s). Also, the systems and methods of the present invention apply to professional sports events, amateur sports events, competitive events, unofficial or unsanctioned events or activities, individual competitive or in-play activities, online gaming events, etc. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A system for betting on a live sporting event, comprising:

a server platform operable to communicate with at least one user device;

wherein the server platform is operable to receive data from the live sporting event, wherein the data from the live sporting event includes data about at least one player at the live sporting event;

wherein the server platform is operable to generate odds based on the data from the live sporting event;

wherein the server platform is operable to receive at least one bet during the live sporting event based on at least one aspect of the live sporting event from the at least one user device;

wherein the server platform is operable to determine at least one betting outcome relating to the live sporting event;

wherein the server platform is operable to access a global positioning system (GPS) or a geofencing system; and wherein the server platform is operable to delay betting from the at least one user device within a predetermined distance of the live sporting event based on location information of the at least one user device obtained from the GPS or the geofencing system.

2. The system of claim 1, wherein the server platform is operable to access personal and/or emotional factors for the at least one player in the live sporting event and/or biometric data for the at least one player in the live sporting event.

3. The system of claim 1, wherein the server platform is operable to generate odds based on biometric data for the at least one player in the live sporting event and/or personal and/or emotional factors for the at least one player in the live sporting event.

4. The system of claim 1, wherein the at least one bet is based on biometric data for the at least one player in the live sporting event and/or personal and/or emotional factors for the at least one player in the live sporting event.

5. The system of claim 1, wherein the server platform is further operable to generate at least one event timeline based on the data from the live sporting event, wherein the at least one event timeline is annotated with when wagers were placed, what type of wagers were placed, and outcomes of wagers placed during the live sporting event.

6. The system of claim 1, wherein the data from the live sporting event includes live raw data from the live sporting event, and wherein the server platform is operable to aggregate the live raw data relating to the live sporting event.

7. The system of claim 1, wherein the server platform further comprises at least one rules engine for authenticating the at least one user device in compliance with at least one rule applied by the at least one rules engine.

8. The system of claim 1, wherein the server platform is further operable to provide time-based coding or stamping for the at least one bet.

9. The system of claim 1, wherein the server platform is further operable to register the at least one bet with a delay.

10. A method for betting on a live sporting event, comprising:

a server platform receiving data relating to the live sporting event;

the server platform generating odds based on the data relating to the live sporting event, wherein the data from the live sporting event includes data about at least one player at the live sporting event;

the server platform receiving at least one bet from at least one user device during the live sporting event on at least one aspect of the live sporting event;

wherein the at least one bet is based on the data received during the live sporting event;

the server platform accessing a global positioning system (GPS) or a geofencing system;

the server platform delaying betting from the at least one user device within a predetermined distance of the live sporting event based on location information of the at least one user device obtained from the GPS or the geofencing system; and the server platform determining at least one betting outcome relating to the live sporting event.

11. The method of claim 10, further comprising the server platform accessing personal and/or emotional factors for the at least one player in the live sporting event and/or biometric data for the at least one player in the live sporting event.

12. The method of claim 10, further comprising the server platform generating odds based on biometric data for the at least one player in the live sporting event and/or personal and/or emotional factors for the at least one player in the live sporting event.

13. The method of claim 10, wherein the at least one bet is based on biometric data for the at least one player in the live sporting event and/or personal and/or emotional factors for the at least one player in the live sporting event.

14. The method of claim 10, further comprising the server platform generating at least one event timeline based on the data from the live sporting event, wherein the at least one event timeline is annotated with when wagers were placed, what type of wagers were placed, and/or outcomes of wagers placed during the live sporting event.

15. The method of claim 10, wherein the data from the live sporting event includes live raw data from the live sporting event, and further comprising the server platform aggregating the live raw data relating to the live sporting event.

16. The method of claim 10, further comprising at least one rules engine of the server platform authenticating the at least one user device as being in compliance with at least one rule applied by the at least one rules engine.

17. The method of claim 10, further comprising the server platform providing time-based coding or stamping for the at least one bet.

18. The method of claim 10, further comprising the server platform registering the at least one bet with a delay.

19. A system for betting on a live sporting event, comprising:

a server platform operable to communicate with at least one user device;

wherein the server platform is operable to receive data from the live sporting event;

wherein the server platform is operable to receive at least one bet during the live sporting event based on at least one aspect of the live sporting event from the at least one user device;

wherein the server platform is operable to access a global positioning system (GPS) or a geofencing system; and wherein the server platform is operable to delay betting from the at least one user device within a predetermined distance of the live sporting event based on location information of the at least one user device obtained from the GPS or the geofencing system.

20. The system of claim 19, wherein the server platform is operable to generate odds based on the data from the live sporting event, and wherein the server platform is operable to determine at least one betting outcome relating to the live sporting event.

* * * * *